United States Patent
Deluca et al.

(10) Patent No.: US 9,251,259 B2
(45) Date of Patent: Feb. 2, 2016

(54) HARMONIZING WEBPAGE INFORMATION

(75) Inventors: Lisa S. Deluca, San Francisco, CA (US); Frank Jania, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1429 days.

(21) Appl. No.: 12/631,932

(22) Filed: Dec. 7, 2009

(65) Prior Publication Data

US 2011/0137858 A1  Jun. 9, 2011

(51) Int. Cl.
*G06F 17/30* (2006.01)

(52) U.S. Cl.
CPC ...... *G06F 17/30864* (2013.01); *G06F 17/3089* (2013.01)

(58) Field of Classification Search
USPC ......................................... 707/723, 706, 736
See application file for complete search history.

(56) References Cited

U.S. PATENT DOCUMENTS

| | | |
|---|---|---|
| 2008/0033941 A1 | 2/2008 | Parrish |
| 2008/0140680 A1 | 6/2008 | Hyder et al. |
| 2008/0168175 A1 | 7/2008 | Tran |
| 2009/0037470 A1 | 2/2009 | Schmidt |
| 2009/0150166 A1 | 6/2009 | Leite et al. |
| 2009/0178125 A1 | 7/2009 | Barber et al. |
| 2010/0076987 A1* | 3/2010 | Schreiner ...................... 707/754 |
| 2010/0082660 A1* | 4/2010 | Muilenburg et al. ......... 707/768 |

FOREIGN PATENT DOCUMENTS

WO  2008088903 A3  7/2008

OTHER PUBLICATIONS

Sirivianos, M. et al. "Facetrust: Assessing the Credibility of Online Personas Via Social Networks" pp. 1-6.

* cited by examiner

*Primary Examiner* — Truong Vo
(74) *Attorney, Agent, or Firm* — Law Office of Jim Boice

(57) ABSTRACT

A descriptive webpage about an entity is harmonized with other electronically published information about the entity. A descriptive webpage, which includes an entity profile about an entity, is located. Other electronically published information about the entity is retrieved. The descriptive webpage is harmonized with the other electronically published information by updating the entity profile with the other electronically published information about the entity.

19 Claims, 4 Drawing Sheets

HARMONIZING WEBPAGE INFORMATION

BACKGROUND

The present disclosure relates to the field of computers, and specifically to information that is displayed on webpages. Still more particularly, the present disclosure relates to harmonizing information presented on a webpage with results from a search.

BRIEF SUMMARY

A computer-implemented method, system, and computer program product for harmonizing a descriptive webpage about an entity with other electronically published information about the entity is presented. A descriptive webpage, which includes an entity profile about an entity, is located. Other electronically published information about the entity is searched for and retrieved. The descriptive webpage and the entity profile are harmonized with the other electronically published information about the entity.

DETAILED DESCRIPTION

Figure 1:
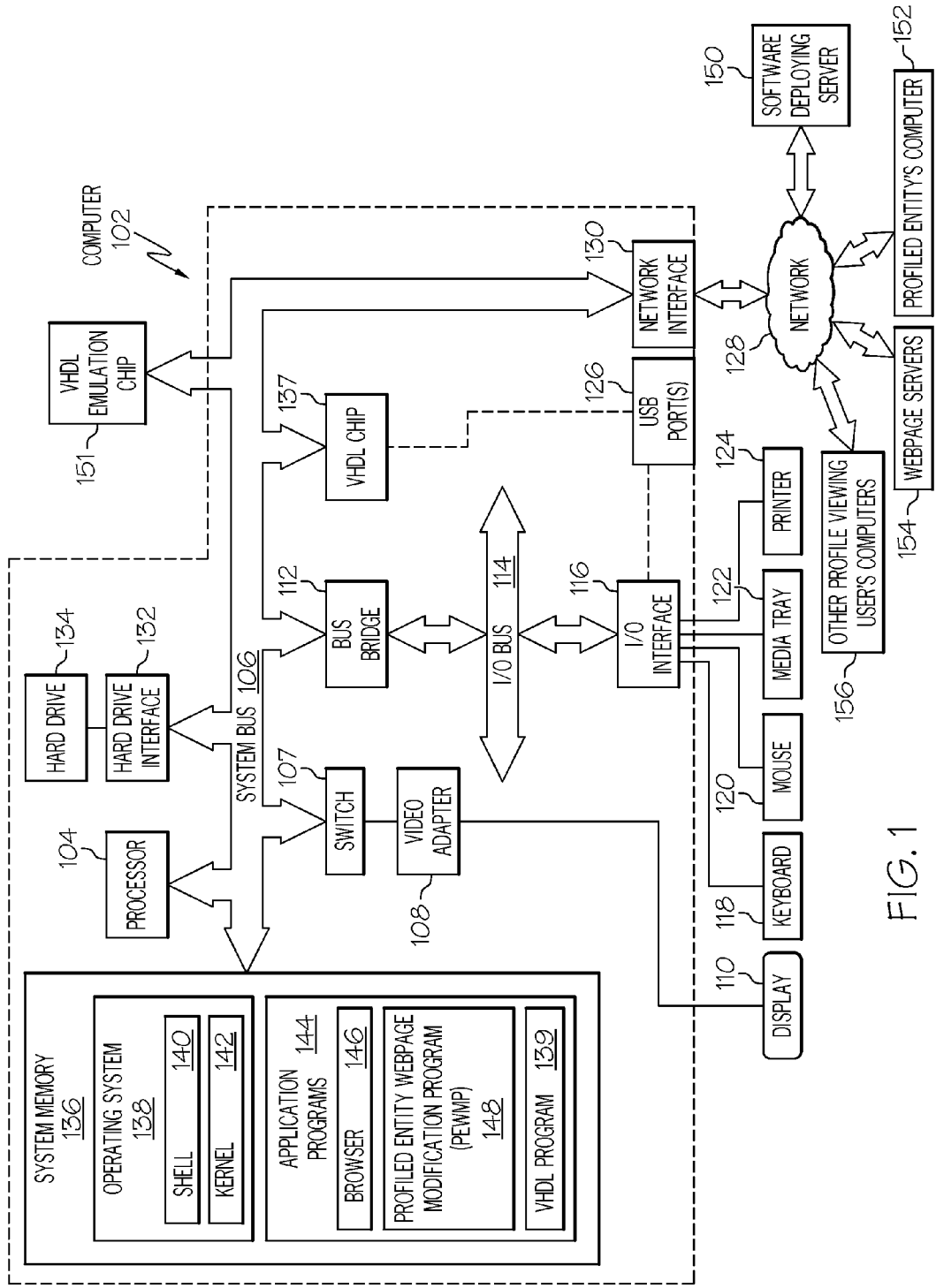
FIG. 1 depicts an exemplary computer in which the present invention may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, profiled entity's computer 152, webpage servers 154, and/or other profile viewing computers 156, as well as profile harmonizing computer 302 shown in FIG. 3.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., profiled entity webpage modification program—PEWMP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 and a sender's SMTP server 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Figure 2:
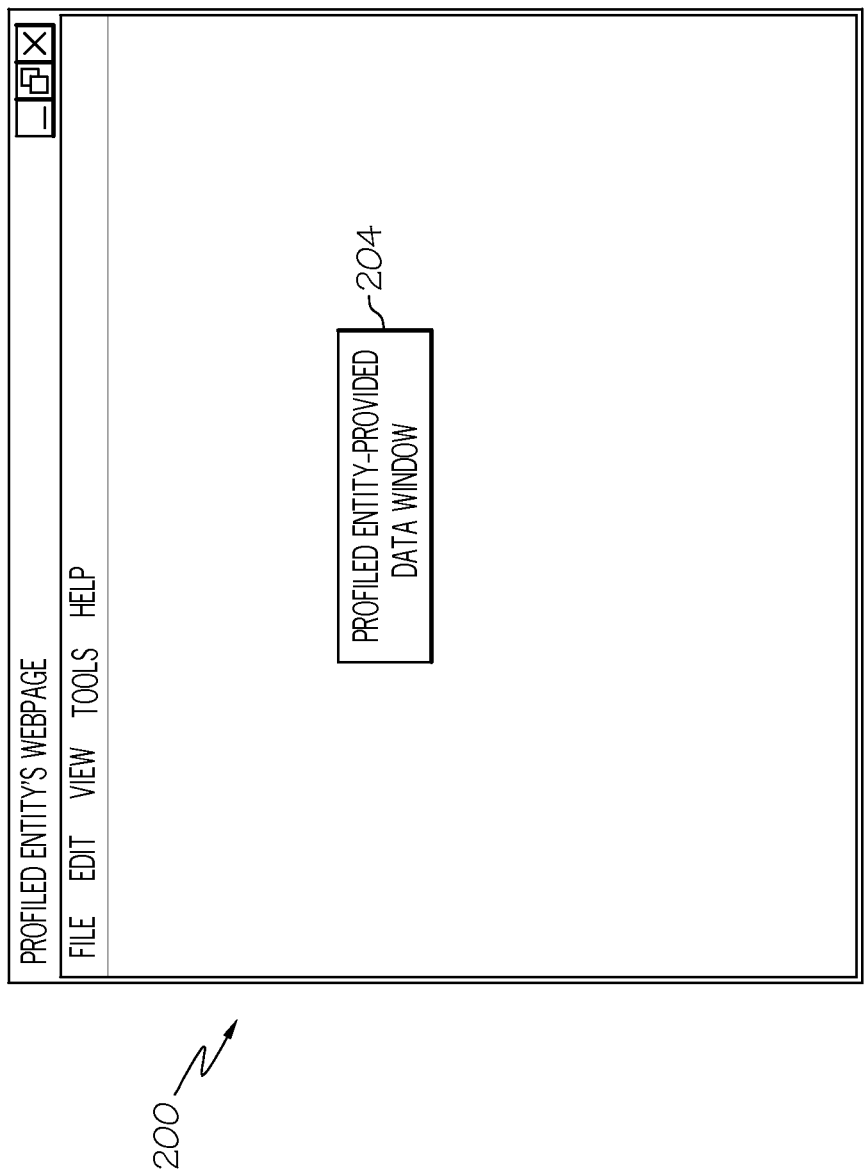
FIG. 2 illustrates an exemplary graphical user interface (GUI) displaying an entity's profile.
Figure 3:
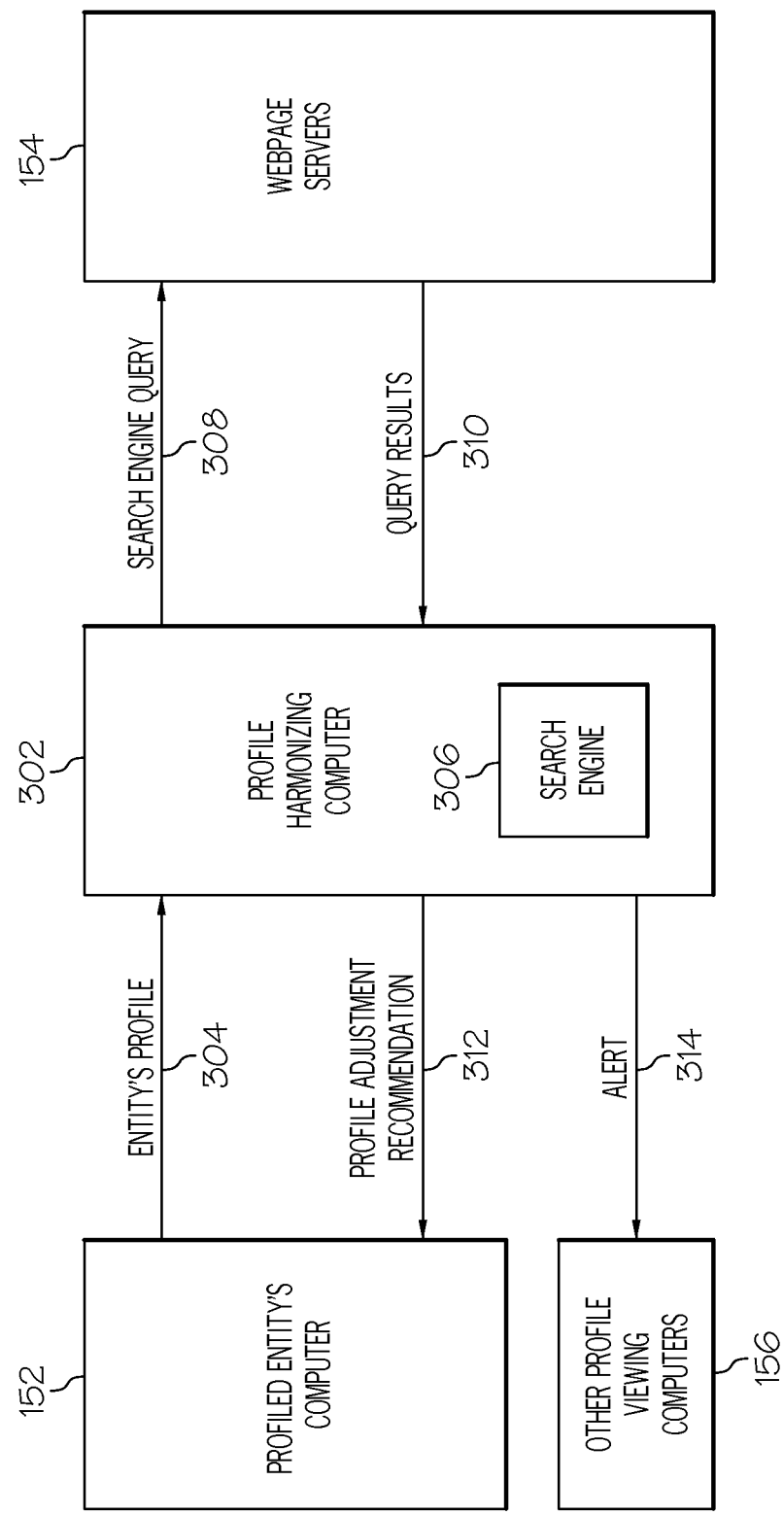
FIG. 3 depicts an exemplary network of computers in which the present disclosure may be implemented.

Application programs 144 in computer 102's system memory (as well as software deploying server 150's system memory, profiled entity's computer 152, webpage servers 154, other profile viewing computers 156, as well as profile harmonizing computer 302 shown in FIG. 3) also include profiled entity webpage modification program (PEWMP) 148. PEWMP 148 includes code for implementing the processes described below, including those described in FIGS. 2-4. In one embodiment, computer 102 is able to download PEWMP 148 from software deploying server 150, including in an on-demand basis. Note further that, in one embodiment of the present invention, software deploying server 150 performs all of the functions associated with the present invention (including execution of PEWMP 148), thus freeing computer 102 from having to use its own internal computing resources to execute PEWMP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from PEWMP 148 causes VHDL program 139 to configure VHDL chip 137, which may be an FPGA, ASIC, etc.

In another embodiment of the present invention, execution of instructions from PEWMP 148 results in a utilization of VHDL program 139 to program a VHDL emulation chip 151. VHDL emulation chip 151 may incorporate a similar architecture as described above for VHDL chip 137. Once PEWMP 148 and VHDL program 139 program VHDL emulation chip 151, VHDL emulation chip 151 performs, as hardware, some or all functions described by one or more executions of some or all of the instructions found in PEWMP 148. That is, the VHDL emulation chip 151 is a hardware emulation of some or all of the software instructions found in PEWMP 148. In one embodiment, VHDL emulation chip 151 is a programmable read only memory (PROM) that, once burned in accordance with instructions from PEWMP 148 and VHDL program 139, is permanently transformed into a new circuitry that performs the functions needed to perform the process described below in FIGS. 2-4.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

With reference now to FIG. 2, an exemplary graphical user interface (GUI) 200 displaying an initial profiled entity's profile is presented. This profile may be for an enterprise, a work group, or any other user-defined entity. Note that in the initial profile, the entity has supplied data about itself in profiled entity-provided data window 204. The present disclosure provides an automated or semi-automated process in which information found in the profiled entity-provided data window 202 can be verified using information from other sources on the Internet and/or World Wide Web (web).

With reference now to FIG. 3, assume that an entity (e.g., a user) associated with profiled entity's computer 152 (introduced in FIG. 1) has created a webpage or other electronically publishable platform on which the entity's profile 304 is created and published. This profile 304, which may include information about the entity's educational background and work experience (if a person), areas of expertise, length of existence (if an enterprise), etc., is received by a profile harmonizing computer 302 (e.g., computer 102 shown in FIG. 1). Utilizing logic found in PEWMP 148, the profile harmonizing computer 302 will launch a search engine 306, which issues a query 308 to webpage servers 154 on the web. Query 308 looks for any webpage that references the entity described in the entity's profile 304. Results of this query (310) are returned to the profile harmonizing computer 302, which determines if there are any inconsistencies between electronically published information from the query results 310 and what is found in the entity's profile 304. If so, then a profile adjustment instruction 312 is issued to the profiled entity's computer 152 to modify entity profile 304. This profile adjustment instruction 312 may cause any incongruous information in the original version of the entity's profile 304 to be automatically overwritten by information discovered by the search engine 306. In one embodiment, such overwriting is predicated on certain pre-established rules. For example, such overwriting may be performed only if a certain number of webpages (e.g., more than three) are located that all have information that contradicts an entry in the initial version of the entity's profile 304. Similarly, a rule may be established that only information from recently published (e.g., within the last year) webpages is to be trusted, or alternatively, only information that is older (e.g., more than a year old) is to be trusted. That is, new information can be deemed "freshest," while old information can be deemed "peer-reviewed" over time. Similarly, only information from webpages that are on a trusted list, or are not on an untrusted list, may be used to override the initial entity's profile 304.

An alert 314 can also be sent to any other profile viewing computers 156 that have a history (with profile harmonizing computer 302) of having viewed the entity's profile 304 in the past. This alert 314 may simply state that the entity's profile 304 has changed (thus prompting the other profile viewing computers 156 to retrieve the updated/harmonized entity's profile), or the alert 314 may describe in detail what changes have been "pushed" onto the entity's profile 304 by the profile harmonizing computer 302.

Figure 4:
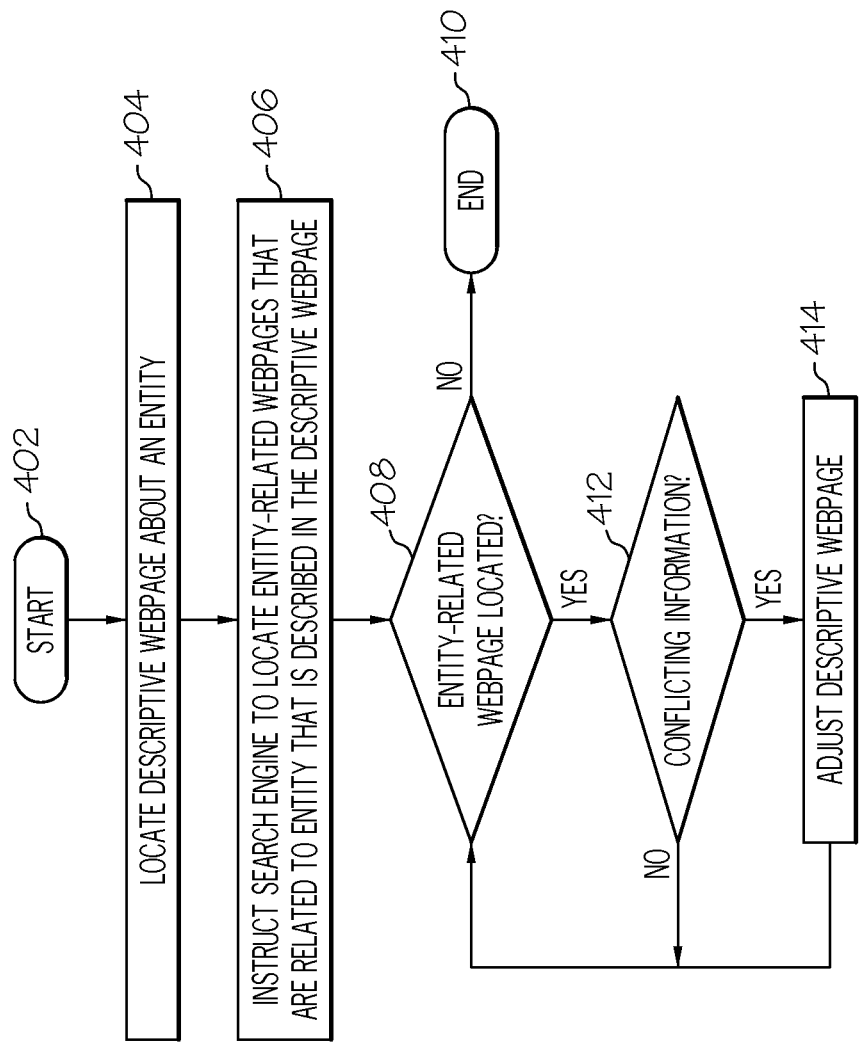
FIG. 4 is a high-level flow-chart of one or more exemplary steps processed by a computer to harmonize the entity's profile with electronically published information about the entity.

Referring now to FIG. 4, a flow-chart of one or more exemplary steps processed by a computer to harmonize an entity's profile with electronically published information about the entity is presented. After initiator block 402, a descriptive webpage about an entity is located (block 404). This descriptive webpage comprises an entity profile about the entity, which may be an enterprise, a group, an individual, or any other user-defined entity. As such, the profile may contain information about the entity's educational background, work history, published papers, client names, length of employment (if a person) or existence (if a company), etc. Rather than force a user to verify what is in the profile by calling references, etc., the present disclosure executes a search by a search engine to locate another entity-related webpage (block 406). This other entity-related webpage contains electronically published information about the entity, which is received by profile confirming computer 302. If no such other entity-related webpage exists or is not located (query block 408), then the process ends (terminator block 410), and the initial version of the entity's profile remains unchanged. However, if such other entity-related webpage exists and is located (query block 408), then a determination is made as to whether the electronically published information about the entity from the other entity-related webpage conflicts with information found in the initial version of the entity's profile (query block 412). If so, then the descriptive webpage is harmonized with the electronically published information from the other entity-related webpage by updating the entity profile with the electronically published information about the entity from the other entity-related webpage. In one embodiment, this profile updating comprises removing information from the entity profile that is not confirmed by the electronically published information about the entity from the other entity-related webpage. In one embodiment, this updating comprises adding information to the entity profile that is not initially found in the entity profile, such that the information that is added to the entity profile is supported by the electronically published information about the entity from the other entity-related webpage. In another embodiment, the profile itself is not actually updated, but rather is given a rating. For example, assume that only 5% of the information in the entity's profile is confirmed by other entries in the WWW. This may results in a message posted on the user's webpage (or sent out as an e-mail, alert, etc.) such as "95% of the entries made in this entity's profile are unverified. Thus, the validity rating is LOW." Note also that in one embodiment, the entity profile initially includes an initial putative timeline of events that the entity claims to have performed or otherwise been involved with. In this scenario, the updating includes adjusting the initial putative timeline of events using the electronically published information from said another entity-related webpage.

Note that while the present disclosure describes augmenting (e.g., updating) an entity profile with data from other searched for and located webpages, in one embodiment the entity can be described by an profile from any type of data resource, including databases, e-mails, etc. Thus, while the present disclosure is described utilizing a search engine to search for relevant webpages to augment/update the entity profile, in another embodiment a search of other resources (e.g., a specific database, e-mails, etc.) can also be performed to locate the requisite resources and data described herein.

Note also that while the present disclosure has been described as harmonizing the entity's profile with other entity-related webpages, in one embodiment this harmonizing can be performed using data from any electronically published information. Such electronically published information may come from any electronic publication, including, but not limited to, network-published databases, e-mail, e-mail attachments, etc.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of harmonizing a descriptive webpage about an entity with other electronically published information about the entity, the computer-implemented method comprising:
    locating a descriptive webpage about an entity, wherein the descriptive webpage comprises an entity profile about the entity;
    receiving other electronically published information about the entity;
    determining whether there are any inconsistencies between information, about the entity, in the descriptive webpage and the other electronically published information;
    in response to determining that there are inconsistencies between information, about the entity, in the descriptive webpage and the other electronically published information, harmonizing the descriptive webpage and the entity profile with the other electronically published information about the entity, wherein said harmonizing modifies the entity profile by overwriting the entity profile with the other electronically published information about the entity;
    using the other electronically published information to determine what percentage of the entity's profile is verified; and
    issuing a validity rating based on the percentage, wherein a lower percentage of verified information in the entity's profile results in a lower validity rating than a higher percentage of verified information in the entity's profile.

2. The computer-implemented method of claim 1, wherein the harmonizing comprises removing information from the entity profile that is not confirmed by the other electronically published information about the entity.

3. The computer-implemented method of claim 1, wherein the harmonizing comprises adding information to the entity profile that is not initially found in the entity profile, but that is supported by the other electronically published information about the entity.

4. The computer-implemented method of claim 1, wherein the entity profile comprises an initial putative timeline of events performed by the entity, and wherein the updating comprises adjusting the initial putative timeline of events using the other electronically published information.

5. The computer-implemented method of claim 1, further comprising:
    harmonizing the descriptive webpage with the other electronically published information only if more than a predetermined number of entity-related webpages contain electronically published information about the entity.

6. The computer-implemented method of claim 1, further comprising:
    recording a history of retrieval of the descriptive webpage by other computers; and
    issuing an alert to the other computers, wherein the alert states that the descriptive webpage has been harmonized to comport with the other electronically published information about the entity.

7. The computer-implemented method of claim 6, wherein the alert details what information in the entity profile was changed by the other electronically published information about the entity.

8. The computer-implemented method of claim 1, further comprising:
    modifying the entity profile by overwriting the entity profile only with other electronically published information about the entity that is from a webpage that is on a trusted list.

9. The computer-implemented method of claim 1, further comprising:
    modifying the entity profile by overwriting the entity profile only with other electronically published information about the entity that is from a webpage that is not on an untrusted list.

10. A computer program product comprising a computer readable storage medium embodied therewith, the computer readable storage medium comprising:
    computer readable program code configured to locate a descriptive webpage about an entity, wherein the descriptive webpage comprises an entity profile about the entity;
    computer readable program code configured to receive other electronically published information about the entity;

computer readable program code configured to determine whether there are any inconsistencies between information about the entity, in the descriptive webpage and the other electronically published information;

computer readable program code configured to, in response to determining that there are inconsistencies between information about the entity in the descriptive webpage and the other electronically published information, harmonize the descriptive webpage and the entity profile with the other electronically published information about the entity, wherein said harmonizing modifies the entity profile by overwriting the entity profile with the other electronically published information about the entity, computer readable program code configured to use the other electronically published information to determine what percentage of the entity's profile is verified; and computer readable program code configured to issue a validity rating based on the percentage, wherein a lower percentage of verified information in the entity's profile results in a lower validity rating than a higher percentage of verified information in the entity's profile.

11. The computer program product of claim 10, wherein the harmonizing comprises adding information to the entity profile that is not initially found in the entity profile, but that is supported by the other electronically published information about the entity.

12. The computer program product of claim 10, wherein the entity profile comprises an initial putative timeline of events performed by the entity, and wherein the updating comprises adjusting the initial putative timeline of events using the other electronically published information.

13. The computer program product of claim 10, further comprising:

harmonizing the descriptive webpage with the other electronically published information only if more than a predetermined number of entity-related webpages contain electronically published information about the entity.

14. The computer program product of claim 10, further comprising:

computer readable program code configured to record a history of retrieval of the descriptive webpage by other computers; and computer readable program code configured to issue an alert to the other computers, wherein the alert states that the descriptive webpage has been harmonized to comport with the other electronically published information about the entity.

15. A computer system comprising:

a central processing unit; and a computer readable memory coupled to the central processing unit, wherein the computer readable memory comprises software that, when executed, causes the central processing unit to implement:

locating a descriptive webpage about an entity, wherein the descriptive webpage comprises an entity profile about the entity;

receiving other electronically published information about the entity;

determining whether there are any inconsistencies between information, about the entity, in the descriptive webpage and the other electronically published information;

in response to determining that there are inconsistencies between information about the entity, in the descriptive webpage and the other electronically published information, harmonizing the descriptive webpage and the entity profile with the other electronically published information about the entity, wherein said harmonizing modifies the entity profile by overwriting the entity profile with the other electronically published information about the entity;

using the other electronically published information to determine what percentage of the entity's profile is verified; and issuing a validity rating based on the percentage, wherein a lower percentage of verified information in the entity's profile results in a lower validity rating than a higher percentage of verified information in the entity's profile.

16. The computer system of claim 15, wherein the updating comprises adding information to the entity profile that is not initially found in the entity profile, but that is supported by the other electronically published information about the entity.

17. The computer system of claim 15, wherein the entity profile comprises an initial putative timeline of events performed by the entity, and wherein the updating comprises adjusting the initial putative timeline of events using the other electronically published information.

18. The computer system of claim 15, wherein the computer readable memory further comprises software that, when executed, causes the central processing unit to implement:

harmonizing the descriptive webpage with the information from the other electronically published information only if more than a predetermined number of entity-related webpages contain electronically published information about the entity.

19. The computer system of claim 15, wherein the computer readable memory further comprises software that, when executed, causes the central processing unit to implement:

recording a history of retrieval of the descriptive webpage by other computers; and issuing an alert to the other computers, wherein the alert states that the descriptive webpage has been harmonized to comport with the other electronically published information about the entity.

* * * * *